(12) United States Patent
Mitchell et al.

(10) Patent No.: US 6,366,214 B1
(45) Date of Patent: Apr. 2, 2002

(54) WARNING LIGHT

(76) Inventors: Ronald L. Mitchell; Glenn H. Grant, both of 5611 E. Morgan Ave., Evansville, IN (US) 47715

( * ) Notice: Subject to any disclaimer, the term of this patent is extended or adjusted under 35 U.S.C. 154(b) by 0 days.

(21) Appl. No.: 09/480,197

(22) Filed: Jan. 10, 2000

(51) Int. Cl.$^7$ .................................................. G08B 5/22
(52) U.S. Cl. .............................. 340/815.45; 340/908.1; 362/235; 315/187
(58) Field of Search ........................... 340/815.45, 331, 340/332, 815.65, 908.1; 362/240, 249, 226, 237, 231, 235, 800; 315/291, 294, 324, 187

(56) References Cited

U.S. PATENT DOCUMENTS

| | | | | |
|---|---|---|---|---|
| 4,884,178 A | * | 11/1989 | Roberts | 362/241 |
| 5,463,280 A | * | 10/1995 | Johnson | 315/187 |
| 5,506,760 A | * | 4/1996 | Giebler et al. | 362/249 |
| 5,513,081 A | * | 4/1996 | Byers | 362/145 |
| 5,526,236 A | * | 6/1996 | Burnes et al. | 362/20 |
| 5,580,156 A | * | 12/1996 | Suzuki et al. | 362/184 |
| 5,585,783 A | * | 12/1996 | Hall | 340/473 |
| 5,635,902 A | * | 6/1997 | Hochstein | 340/433 |
| 5,688,042 A | * | 11/1997 | Madadi et al. | 362/240 |
| 5,806,965 A | * | 9/1998 | Deese | 362/249 |
| 5,850,126 A | * | 12/1998 | Kanbar | 315/200 A |
| 5,898,381 A | * | 4/1999 | Gartner et al. | 340/815.65 |

* cited by examiner

Primary Examiner—Edward Lefkowitz
Assistant Examiner—Davetta W. Goins
(74) Attorney, Agent, or Firm—Gary K. Price

(57) ABSTRACT

A warning light that comprises at least one circuit board with a multiplicity of LEDs which has a low current draw as compared to an equivalent incandescent bulb, and fits a standard incandescent light socket.

4 Claims, 4 Drawing Sheets

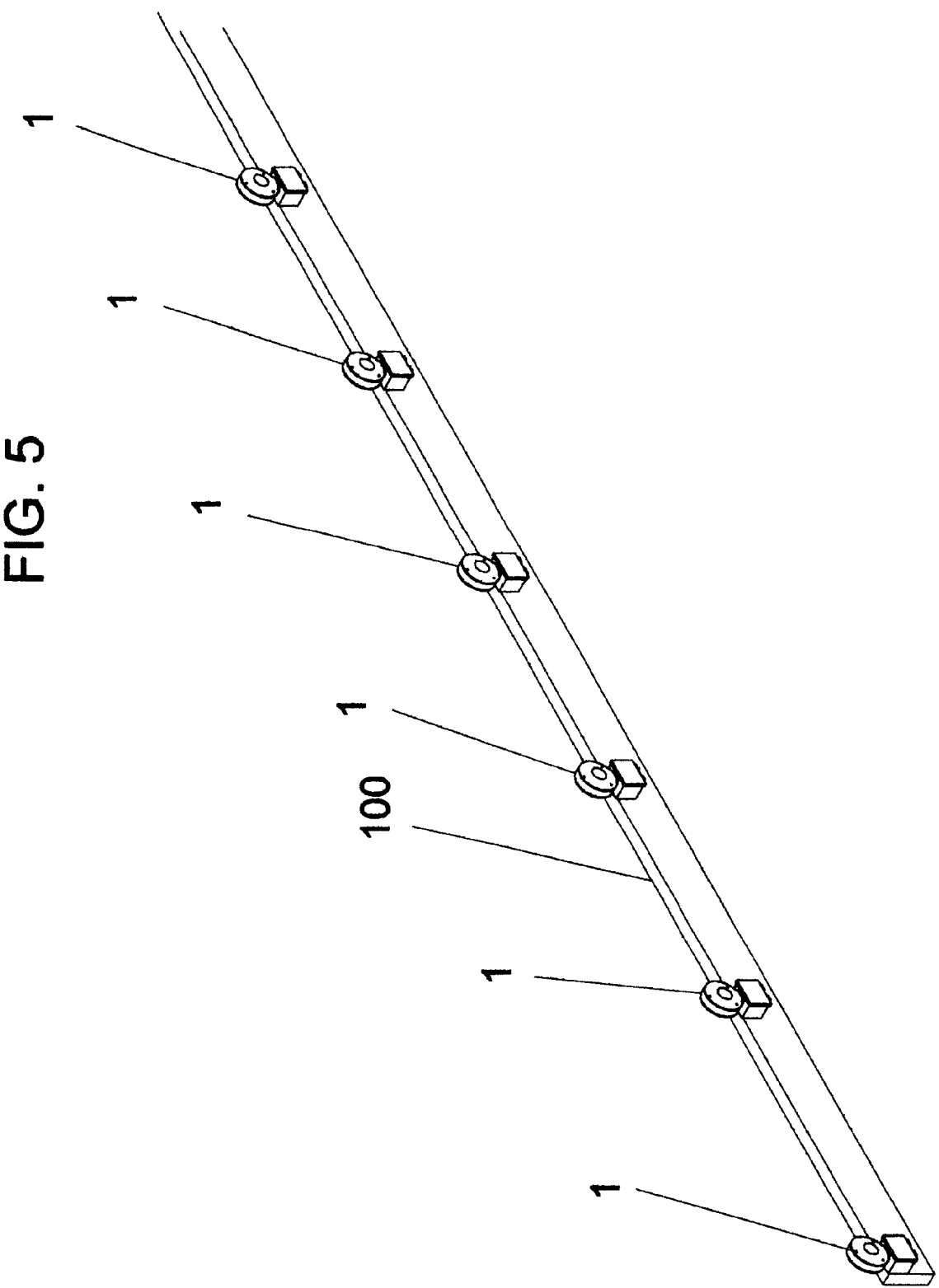

WARNING LIGHT

CROSS REFERENCES TO RELATED APPLICATION

None

Statement as to rights to inventions made under Federally sponsored research and development: Not Applicable

BACKGROUND OF THE INVENTION

1. Field of the Invention

This invention relates to a warning light comprised of at least one circuit board and a multiplicity of LEDs replacing an incandescent bulb such as would be usually attached to a gate, or a gate arm. It would also be applicable wherever incandescent bulbs are used as warning lights.

2. Background Information

Current practice is to use standard incandescent bulbs, such as 18 or 25 watt bulbs, in assemblies attached to railroad gate arms. A problem is encountered in current draw, typically 1.8 or 2.5 amps for these bulbs. With a multiplicity of bulbs attached to a gate arm, such as is used at railroad crossings, the current draws accumulate. Also, the bulbs tend to burn out, requiring replacement. Also, the gate arm swinging up and down, as required, tends to shorten the life of the bulbs in the assemblies attached to the railroad gate arms.

A Light Emitting Diode, known in the trade as an LED, is a semiconductor diode that emits light when energized by current. It is presently used in electronic equipment especially for displaying readings on digital watches and calculators. LEDs that fit a standard incandescent light bulb socket, are not currently used, to the inventors knowledge, to replace incandescent bulbs, especially bulbs of 18 watts or more, or for illuminating railroad crossing gate arms.

As will be seen from the subsequent description, the preferred embodiments of the present invention overcome the current limitations of existing warning lights, especially gate or gate arm warning lights.

SUMMARY OF THE INVENTION

The present invention comprises at least one circuit board with LEDs mounted in conjunction with a support block into a bulb case that mates with a light socket extending from a standard signal case.

BRIEF DESCRIPTION OF THE DRAWINGS

FIG. 5 illustrates a gate arm having installed a plurality of LED light assemblies.

DESCRIPTION OF THE PREFERRED EMBODIMENTS

Figure 1:
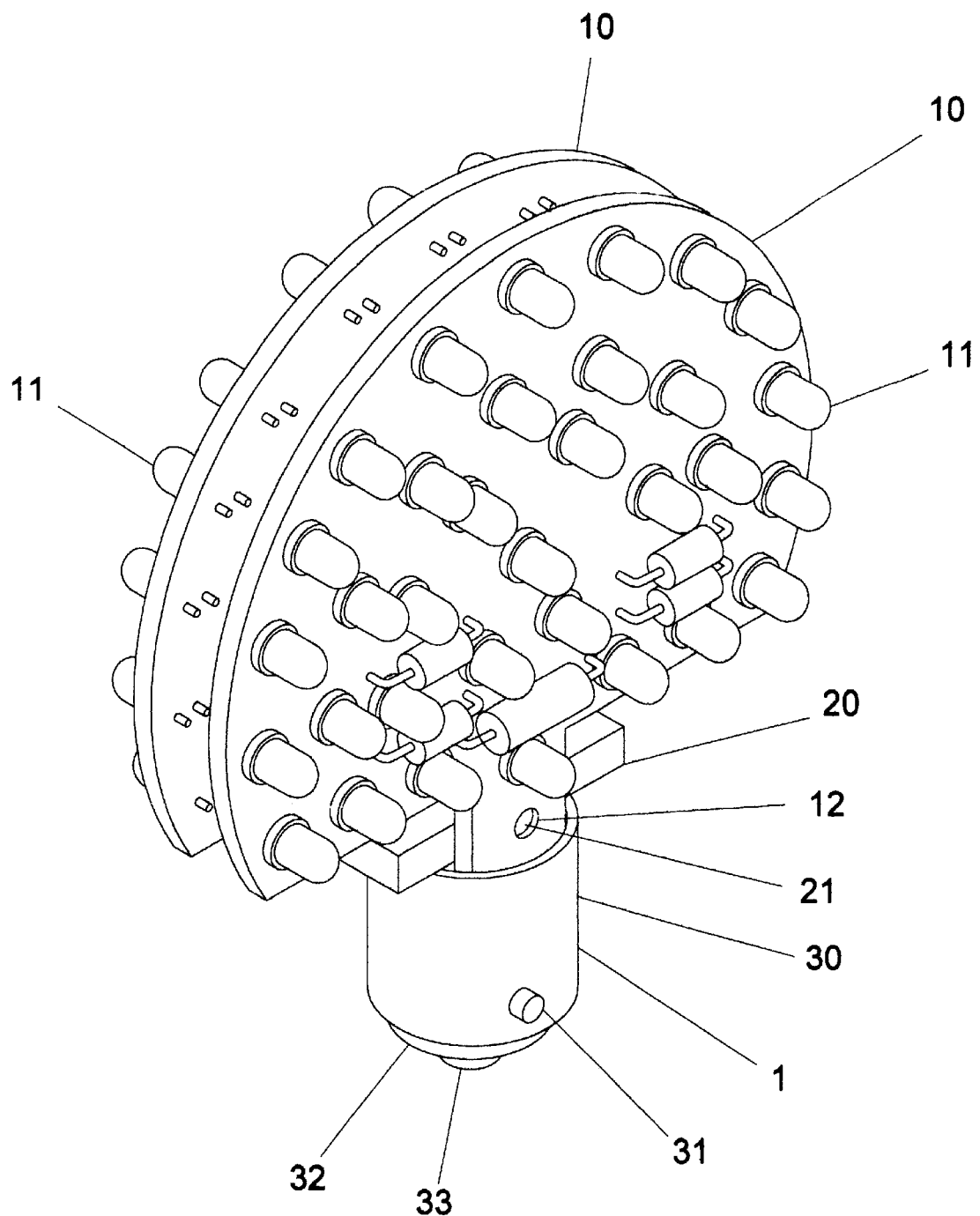
FIG. 1 illustrates the preferred embodiment of the present invention, an LED light assembly.

As shown in FIG. 1, the present invention, an LED light assembly 1 comprises at least one circuit board 10 with a multiplicity of LEDs 11, a support block 20, and a bulb case 30. The at least one circuit board 10 in conjunction with the support block 20 is installed in the bulb case 30. The at least one circuit board 10 further comprises an alignment clearance 12. The support block 20 comprises a locating stud 21. The alignment clearance 12 accepts the locating stud 21 for positioning of the support block 20 with respect to the at least one circuit board 10. The combination of the locating stud 21 and the alignment clearance 12 serve as a means of aligning the support block 20 with respect to the at least one circuit block 10. As obvious to anyone skilled in the art, there are a number of ways to achieve a means of aligning the support block 20 with respect to the at least one circuit board 10.

The bulb case 30 comprises an alignment/locking stud 31, an insulator 32, and a positive terminal 33.

Figure 2:
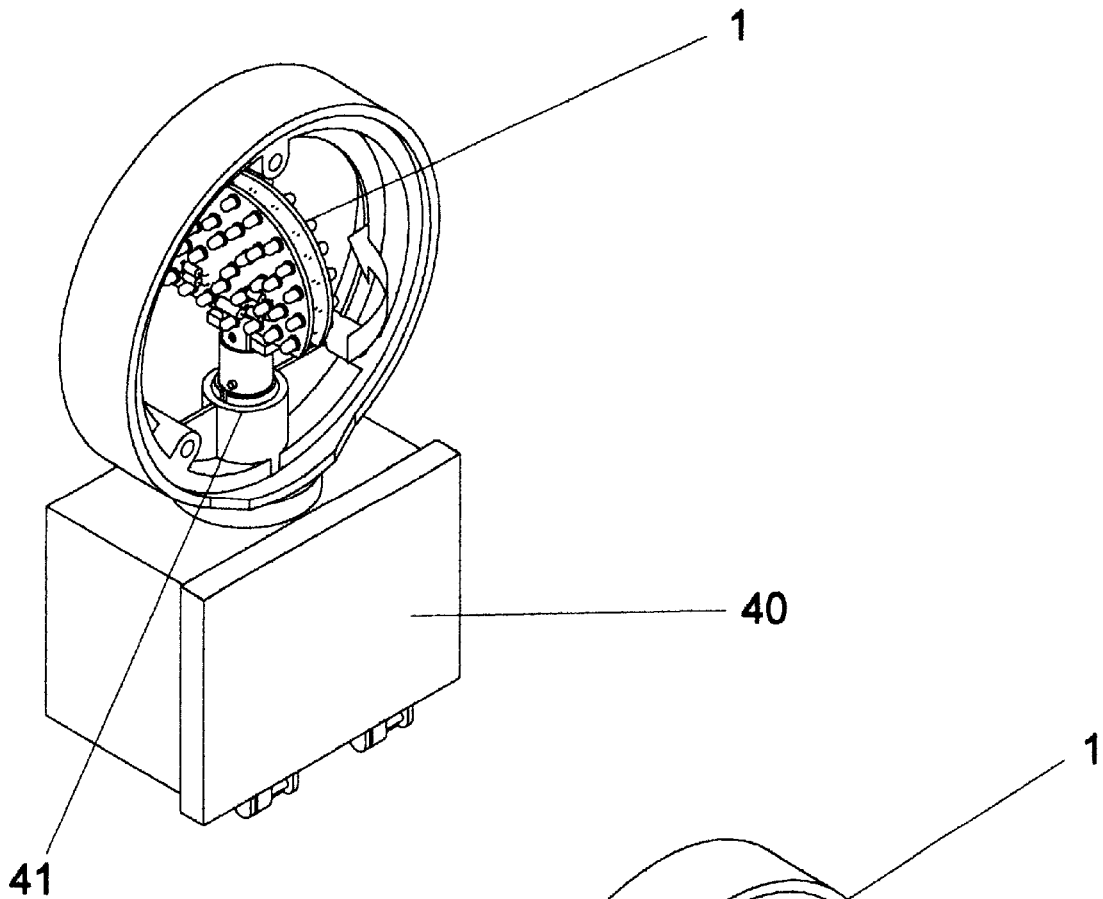
FIGS. 2 & 3 illustrate placement of the LED light assembly into a light socket extending from a signal case.
Figure 3:
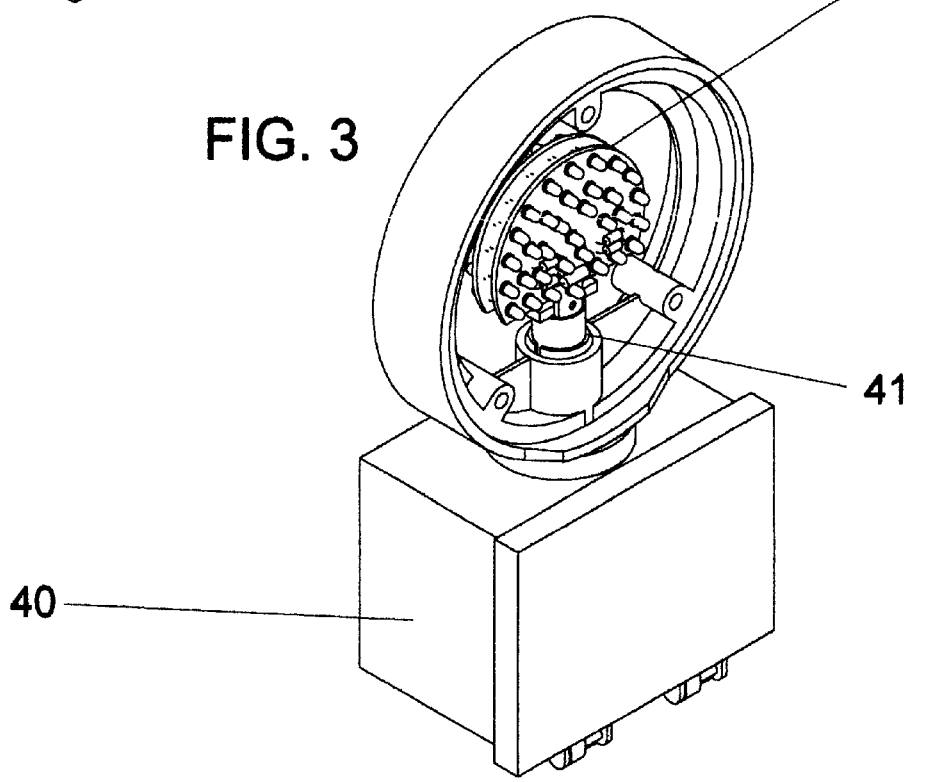

FIGS. 2 and 3 illustrate the LED light assembly 1 initially positioned in a light socket 41 extending from a signal case 40. An arrow indicates direction of rotation for locking of the LED light assembly 1 into position in the light socket 41 extending from the signal case 40.

Figure 4:
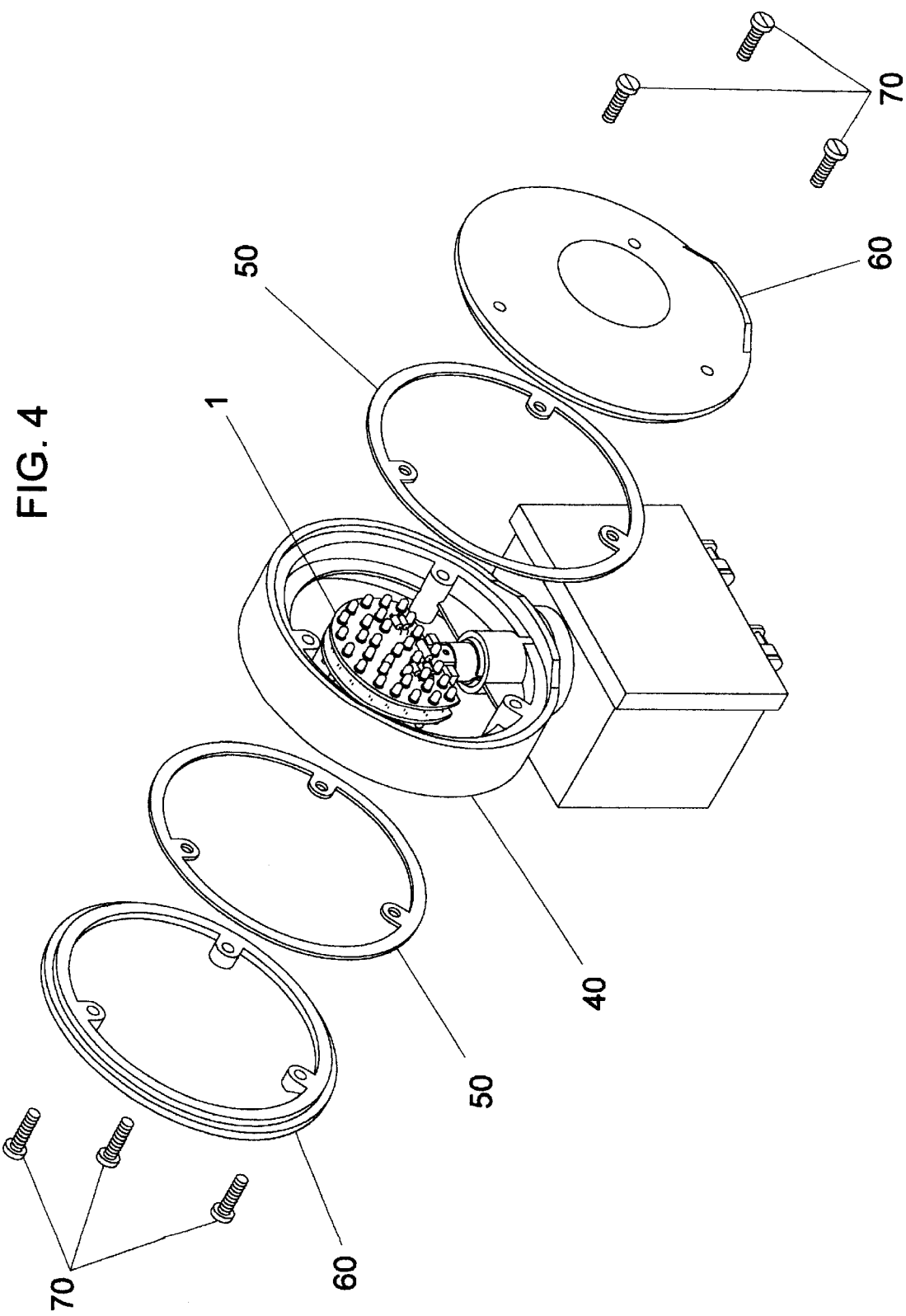
FIG. 4 illustrates additional componetry enhancing the LED light assembly installed in the light socket extending from the signal case.

FIG. 4 shows additional parts that can be added to the LED light assembly 1 for performance and life enhancement, namely gaskets 50, lenses 60, and fasteners 70 wherein the gaskets 50 provide a seal between the signal case 40 and the lenses 60, and the fasteners 70 secure the lenses 60 and the gaskets 50 to the signal case 40.

FIG. 5 illustrates a gate arm, such as would be usable as a railroad gate arm 100, carrying at least one LED light assembly 1.

The lenses 60 can be a transparent colored plastic or glass. The lenses 60 are common to the trade. The gaskets 50 can be of any suitable gasket material. The signal case 40 can be of metal or plastic. The bulb case 30 typically is of brass. The circuit board 10 and the LEDs 11 are of materials known to the trade.

Although the description above contains many specificities, these should not be construed as limiting the scope of the invention but is merely providing illustrations of some of the presently preferred embodiments of this invention.

For example, while the invention is discussed in terms of a gate arm light, the invention serves quite well wherever a warning light with a low current usage as compared to conventional bulbs is desirable. The present invention lends itself to remote applications where battery power is a desirable option. While the invention works with conventional electrical power, the low current requirements make it very applicable to relatively inaccessible locations. Also, the present invention has an estimated life expectancy of 100,000 hours, which exceeds the life expectancy of conventional bulbs. As an example, at 10 volts, an LED light assembly 1 with two circuit boards 10, each with 33 LEDs, requires only 0.35 amps, as compared to 1.8 amps for an 18 watt bulb or 2.5 amps for a 25 watt bulb at the same 10 volts. Each LED emits at least one candela. While an LED may currently be used as a warning in an electronic assembly, this inventor does not know of instances where a multiplicity of LEDs are replacing 18 watt or larger incandescent bulbs as a warning light.

Thus the scope of the invention should be determined by the appended claims and their legal equivalents, rather than by the examples given.

What is claimed is:

1. An LED lighting display used to replace a conventional lightbulb comprising:

a conventional cylindrical bulb case having an alignment/locking stud, a multiplicity of leds arranged on a substantially planar surface set within the bulb case, a signal case supporting said bulb case, said signal case including at least one substantially planar lense, support block means for aligning said LED lighting display with said bulb case such that when said bulb case is placed in said signal case, the planar surface of said LED lighting display and said planar lense are adjacent and parallel to one another.

2. An LED lighting display used to replace a conventional lightbulb in a lighting display having a planar lense comprising:

a conventional cylindrical bulb case having an alignment/locking stud, a first multiplicity of leds arranged on a substantially planar surface set within the bulb case, a second multiplicity of leds arranged on a second substantially planar surface set within the bulb case, a signal case supporting said bulb case, said signal case including a first substantially planar lense, support block means for aligning said LED lighting display with said bulb case such that when said bulb case is placed in said signal case, the planar surface of said first multiplicity of leds of said LED lighting display and the planar lense are adjacent and parallel to one another.

3. The LED lighting display of claim 2 further comprising a second substantially planar lense, and further such that when said bulb case is placed in said signal case, the planar surface of said second multiplicity of leds of said LED lighting display and the second planar lense are adjacent and parallel to each other and are casting light in substantially the opposite direction of said first multiplicity of leds.

4. An LED roadway lighting display used to replace a conventional lightbulb in a lighting display having a planar lense, that is visible from opposite directions of traffic comprising:

a conventional cylindrical bulb case having an alignment/locking stud, a first substantially planar display of multiple leds set within the bulb case casting light through a lense in a first direction, a second substantially planar display of leds set within the bulb case casting light through a second lense in a direction opposite to said first direction, a signal case supporting said bulb case, support block means for aligning said first planar display of leds and said second display of leds on the bulb case such that when the bulb case is placed in a signal case containing said first and said second lenses, the first and second planar display of leds align with said first and second lenses to properly focus light in both of said directions.

* * * * *